Aug. 26, 1947.  C. ANDERSON  2,426,383
ELECTRICAL MEASURING APPARATUS
Original Filed April 22, 1944    2 Sheets-Sheet 1
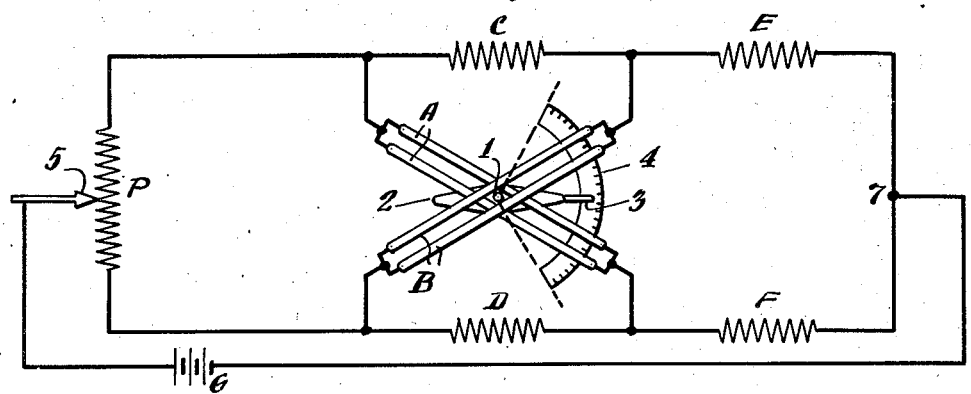
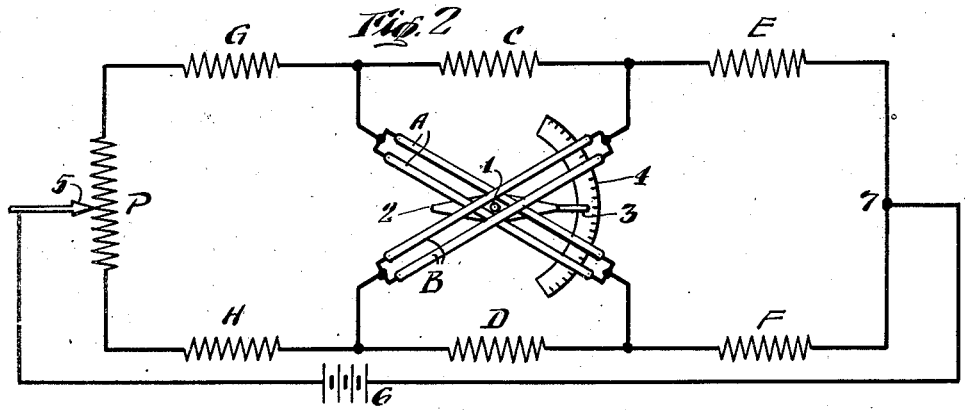
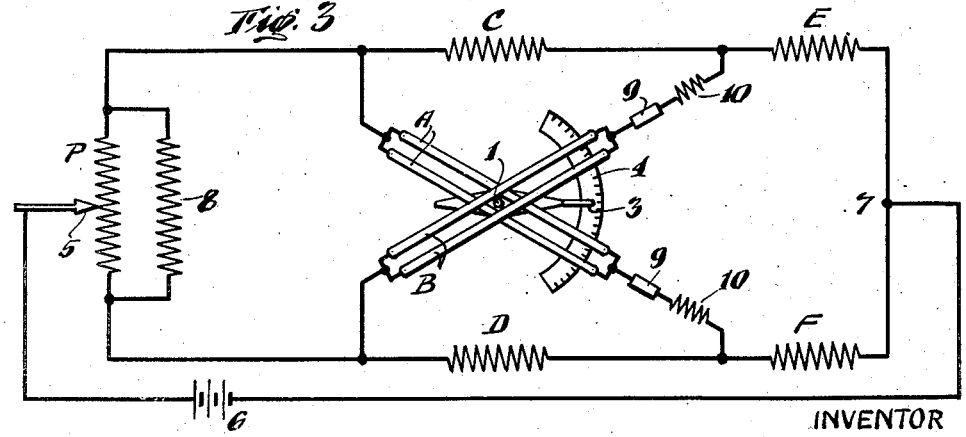
INVENTOR
Clare Anderson
BY
ATTORNEYS Aug. 26, 1947.  C. ANDERSON  2,426,383
ELECTRICAL MEASURING APPARATUS
Original Filed April 22, 1944   2 Sheets-Sheet 2
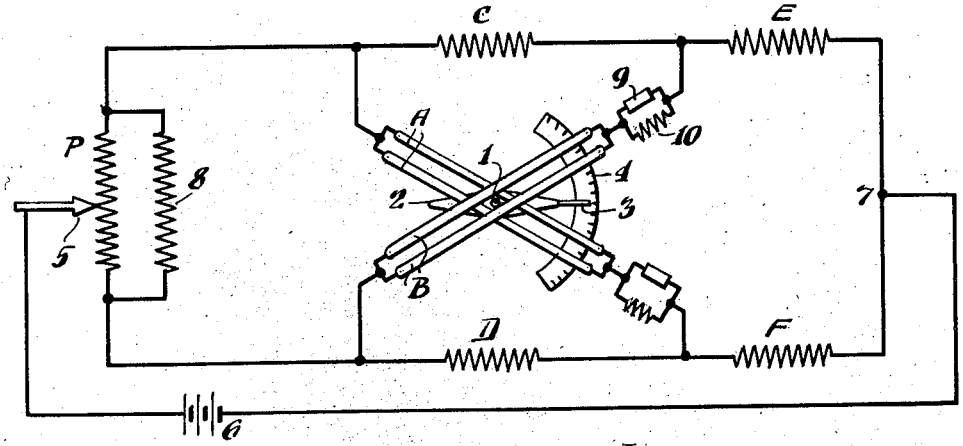
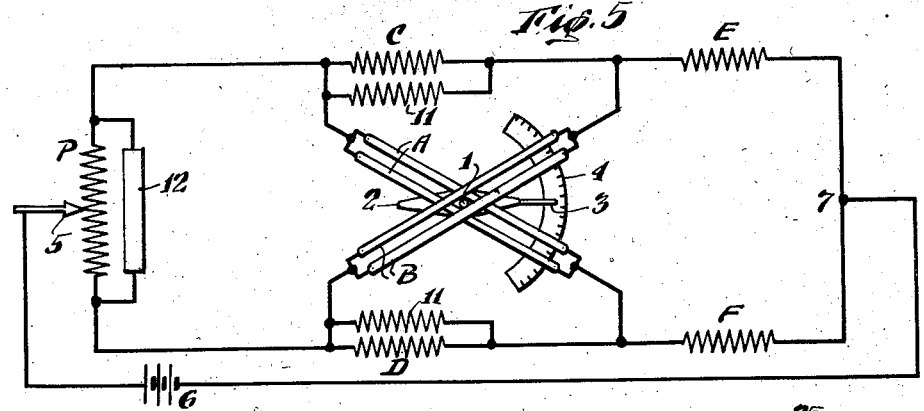
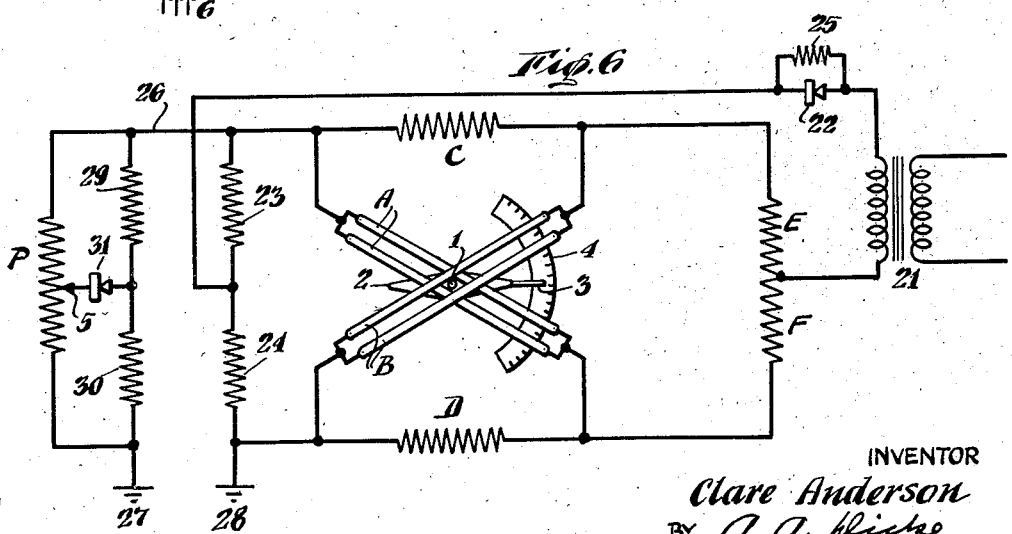
INVENTOR
Clare Anderson
BY
ATTORNEYS Patented Aug. 26, 1947

2,426,383

UNITED STATES PATENT OFFICE 2,426,383

ELECTRICAL MEASURING APPARATUS

Clare Anderson, Fayson Lakes, N. J., assignor to Realty Industrial Corporation, a corporation of New Jersey Original application April 22, 1944, Serial No. 532,221. Divided and this application March 16, 1946, Serial No. 654,947

15 Claims. (Cl. 171—95)

This invention relates to electrical measuring apparatus particularly applicable to ratio measuring instruments; and to improved bridge connections and associated parts.

This application is a division of my co-pending application, Serial No. 532,221, now Patent No. 2,399,903, filed April 22, 1944.

The apparatus may be used to measure values, or indicate change of values of a variable factor of any character such as of pressure, liquid levels, magneto-motive forces, current or voltage and the like. Such values, in the most general use of the present invention, may be reflected in the movement of a contact which is adjustable over a variable impedance or resistance device; and the ratio instrument will then indicate the position and change of position of such a contact. The measuring apparatus may be located remote from the source or location of the variable factor to be measured or indicated.

One object of the present invention is to provide an improved bridge connection and relationship of parts which will be essentially independent of change of voltage applied to the bridge circuit and thereby minimize any effect of such change of voltage on the instrument indication. Another object is to control the range of movement of the indicating pointer of the ratio meter and thereby expand or contract the range of scale readings. A further object is to provide means for increasing the sensitivity of response of the instrument and for adjustment of such sensitivity. Another object is to provide apparatus which is generally applicable to various purposes and which is readily adaptable to various conditions. Further objects are to provide apparatus which will occupy small space in compact form, utilize materials which are of low cost and easily obtainable and be durable and dependable under long continued use. Other objects and advantages will be understood from the following description and accompanying drawings, which disclose embodiments of the various features of improvement.

Fig. 1 is a diagram of parts and connections showing one form of bridge and instrument connections; Fig. 2 is a similar diagram with additional means to vary the sensitivity of response; Fig. 3 is a similar diagram with the provision of means for compensating for temperature changes; Fig. 4 is a diagram similar to Fig. 3 with the temperature compensators in parallel connection; Fig. 5 is a diagram similar to Fig. 1 showing another way of compensating for changes in temperature; and Fig. 6 is a diagram wherein a single transmission unit is used from the controlling source to the receiver and wherein the energy is derived from an alternating current source.

Referring to Fig. 1, a ratio indicating instrument is represented having a pair of fixed coils A and a pair of fixed coils B at an angle to the coils A. Coils A and B have the same number of turns and are as nearly as possible identical in geometric shape, the planes of the coils being shown perpendicular to that of the drawing. At the central space between the coils where they cross is pivotally mounted a staff 1 supporting a permanent magnet 2. This carries a pointer 3 which is movable over a fixed graduated scale 4. The two coils A may be considered a single coil and likewise the two coils B, their division being for the purpose of providing a space for the pivotal mounting of the permanent magnet 2 within the coils. The permanent magnet will occupy an indicating position determined by the ratio of the current in the windings A and B provided the magnet is shielded from the influence of external magnetic fields.

If the currents in the two windings A and B are equal, the permanent magnet 2 will occupy a mid-position as indicated in Fig. 1. If there be no current in the winding B and the current in winding A be at a maximum value, or at any value, the magnet 2 will occupy a position coinciding with the axis of the winding A and if there be no current in the winding A and a current exists in the winding B, the magnet will occupy a position coinciding with the axis of the winding B. However in the use of ratio instruments the range of deflection of the permanent magnet and indicating needle is limited in certain types of circuits because the current in either one of the two windings A or B cannot be reduced to zero value or to a close approach thereto.

By the present invention, in circuits such as shown in Fig. 1, the relationship of the parts and their connections and the impedance values may be made such that the current in the two windings A and B may be reduced to zero or reversed and thereby enable the permanent magnet to take a position coinciding with or overrunning the axis of the windings A and B respectively. It follows that under such conditions a ratio indicator may be made to give an increased range of movement of the indicating pointer, larger than would be obtained without this type of connection. When the current in winding B is zero, the current in winding A will cause the permanent magnet to coincide with the axis of the winding A, giving a deflection of the magnet and indicating needle to the position indicated in dotted lines extending to the upper limit of the scale. When the current in winding A is zero, then the current in winding B will cause the permanent magnet and indicating needle to assume a position indicated by the dotted lines extending to the lower end of the scale. Therefore the range of deflection of the indicating needle and the range of the scale will cover 120° with the particular relationship as shown in Fig. 1 compared with a much smaller range in the usual ratio meter. A greater range than that shown in Fig. 1 may be obtained by increasing the angular displacement between the windings A and B or a smaller range may be obtained by reducing this angular relationship. But the assumed displacement of the coils have been found practical with the type of ratio indicator shown in Fig. 1.

Fig. 1 shows a bridge connection of various parts wherein a potentiometer or variable impedance device P, having an adjustable contact 5 is incorporated. This contact is adjustable in response to change of any controlling factor such as a variable pressure or liquid level, variable optical, thermal, electric and magnetic quantities, and so forth, and by this bridge arrangement the ratio instrument will indicate the value and change in values of any such variable factor according to the position of the variable contact. As the means for adjusting or for otherwise changing the relative values of P may be of various forms, no such means are disclosed in Fig. 1.

The source 6, indicated as a battery, supplies energy to the bridge, although any suitable direct current source may be used; and in some cases an alternating current source may be utilized. One lead from the source is connected to the adjustable contact 5 and the other lead connected at 7 to the bridge circuit. Impedance devices C and E are connected in series with each other from one terminal of P to the connection 7; and similar impedance devices D and F are connected in series with each other from the other terminal of P to the connection 7. The ratio instrument winding A is connected from a connection between P and C to a connection between D and F; and the instrument winding B is similarly connected from a connection between P and D to a connection between C and E. The impedance of C is equal to that of D; the impedance of E is equal to that of F; and the impedance of A is equal to that of B in the following considerations.

Assuming that the impedance values of the different parts of the circuit are of proper amounts and that the slider 5 is at the upper terminal of P, the current in winding B will have zero value and the current in winding A will have its maximum value. Then the permanent magnet 2 and its needle will take a position coinciding with the axis of the winding A and the needle will be over the upper limit of the scale. This condition exists when the following relationship of impedances is fulfilled.

*Equation 1*

$$\frac{C}{P} = \frac{E}{F + D + F\frac{(D+P)}{A}}$$

When the slider 5 is at the upper end of P and the current in B is zero, the potential difference at the terminals of B must be zero which requires that the voltage drop in C must equal the voltage drop in P. When the slider is adjusted from the upper end of P downwardly, the current in A will gradually decrease and the current in B will gradually increase, causing the needle of the instrument to move correspondingly. When the slider is at the midpoint of P, the current in the windings A and B will be equal in value and the needle will assume a mid-position on the scale plate. Continued movement of the slider will cause the current in A to decrease and that in B to increase; and when the slider is at the lower end of P the current in A will be zero and that in B will be a maximum. Then the instrument needle will assume a position coinciding with the direction of the axis of B and be over the lower limit of the scale. The drop in volts in P must then equal the drop in volts in D, giving zero potential difference at the terminals of winding A.

It is apparent that any change in the voltage of the source over broad ranges applied to the bridge circuit has no appreciable effect upon the indications of the instrument in its response to the position of the slider 5 or change of its position. Also the range of movement of the instrument indications and its scale attains an expansion over that obtained with the usual circuit connections of a ratio instrument.

In order to satisfy the foregoing Equation 1 and to properly match the impedance values with an efficient utilization of the energy in the bridge circuit, the following is an example of values of the impedances of the different parts of the circuit for obtaining the results described, or a very close approximation thereto.

P=2 ohms
A and B each=4.73 ohms
C and D each=.65 ohms
E and F each=.43 ohms

In Fig. 2, the connections are the same as in Fig. 1 and corresponding parts are indicated by the same reference characters. But in Fig. 2 additional impedance devices G and H are added in the bridge circuit between P and C and between P and D respectively. These additional impedance devices serve as additional means to control the sensitivity of response of the ratio instrument. The impedance of the device G is made equal to the impedance of the device H; and when the impedance of C equals D, E equals F, and A equals B, and with the slider at the upper end of P and with zero value of current in B, the following equation expresses the proper relationships:

*Equation 2*

$$\frac{C}{P} = \frac{E(A-C)}{G(4E+A+C)+E(A+C)+AC}$$

When the slider is moved downwardly the current in coil A will decrease and that in coil B will increase and when the slider is at its mid-position the current in each coil of the instrument will be the same, giving a mid-point indication of the meter. As the slider continues to move downwardly, the current in winding A will continue to decrease and that in B will continue to increase and when the slider is at the lower end of P, the current in the coil A will attain a zero value and that in coil B will attain its maximum value, giving a full deflection of the meter to the lower end of the scale.

As an example of impedance values for obtaining these results, or a close approximation thereto, the following value will give proper matching relationship of the impedances:

P=2 ohms
G and H each=.5 ohms
A and B each=3.33 ohms
C and D each=.31 ohms
E and F each=.21 ohms This relationship may be modified to some extent and still obtain satisfactory, practical results even though the current in windings A and B does not have zero value in the limiting positions of the slider.

In Fig. 3 a bridge circuit is utilized in which the resistances of the parts have much higher values than those previously considered and has the advantage of a greater utilization of energy in the network from the source 6. The adjustable impedance device P is shown shunted by a resistor 8 of greater resistance than that of P. Fig. 3 also shows the addition of means for compensating for changes of resistance in the windings A and B due to temperature changes, these windings being preferably of copper. In series with each of these windings a resistor 9 of carbon having a negative temperature coefficient is provided which in turn is in series with a resistor 10 of a material having approximately zero temperature coefficient, such as manganin or cupron. Each of the other resistors C, D, E, F and P are also of such material of approximately zero temperature coefficient within the range of temperature changes in the use of the apparatus. The circuit of Fig. 3 has been found to give a high degree of freedom from temperature errors by the use of available materials, the compensating of the A and B windings serving to minimize mismatching of the circuit relationships under temperature changes. The following values for obtaining proper balancing of the bridge circuit and for giving approximately zero current in A or B at the limits of adjustment of P have been found to give desirable results:

P=100 ohms
8=500 ohms
A and B each=80 ohms
C and D each=32.5 ohms
E and F each=21.5 ohms
9 and 9 each=100 ohms
10 and 10 each=60 ohms The shunting resistor 8 of Fig. 3 may be omitted in some cases and under such conditions the following values of resistances have served to obtain matching proportionality of the circuit with advantageous results:

P=400 ohms
A and B each=320 ohms
C and D each=130 ohms
E and F each=86 ohms
9 and 9 each=400 ohms
10 and 10 each=240 ohms In the foregoing examples, the carbon resistors 9 were assumed to have a negative temperature coefficient of .0033. By using carbon resistors 9 having a much higher negative temperature coefficient than that considered in the last examples, such as of .061, the resistance of the various devices may be considerably reduced and circuit matching approximately obtained by the following values with good results:

P=100 ohms
A and B each=80 ohms
C and D each=32.5 ohms
E and F each=21.5 ohms
9 and 9 each=23 ohms
10 and 10 each=137 ohms Instead of ballasting to minimize mismatching of the circuit under changes in temperature as above described by placing the negative coefficient resistor 9 in series with the resistor 10 of approximately zero temperature coefficient and in series with the windings A and B respectively, the ballasting resistors 9 and 10 may be in parallel with each other and in series with the windings A and B respectively, as shown in Fig. 4.

Compensation for temperature changes may be accomplished by utilizing copper in the windings A and B, manganin or a low coefficient nickel alloy in the resistors E and F, manganin or cupron in P, copper in C and D, shunting P with a carbon resistor and shunting C and D with resistors of manganin. Fig. 5 shows such an arrangement with manganin resistors 11 shunting C and D respectively. The potentiometer P is shown shunted by a carbon resistor 12, the potentiometer being compensated at its location because of possible differences in temperature changes at its location and that of the other portions of the bridge circuit. If P be made of low temperature coefficient material, the shunt resistor 12 may be advantageously used. An advantage of the circuit of Fig. 5 is that the resistance of all of the cross connecting circuits of the A and B coils is included within the operating coils giving effective use therein of the energy of those circuits. Approximate resistance values for approximate proportional matching of the bridge circuit of Fig. 5 may be as follows:

P=100 ohms
A and B each=236 ohms
C and D each=32.5 ohms
E and F each=21.5 ohms

In all of the foregoing the values of resistances or impedances given are their approximate values at 25° centigrade. These relative values may be departed from somewhat and still obtain satisfactory practical results.

Fig. 6 shows a system wherein only one wire is used between the converter, or source of control, and the receiver, or instrument network. Here a source of alternating current is utilized, indicated by a transformer 21. One terminal of the secondary winding is connected between the impedance devices E and F. The other terminal is connected to a half wave rectifier or electric valve 22, from which the circuit continues to the intermediate connection of equal impedance devices 23 and 24, which are connected to opposite sides of the network at the control end. The valve 22 is shunted by a comparatively high resistor 25. A pulsating current will thus be passed through the network dividing in equal amounts through the network branches and thereby tend to maintain the indicating needle 3 at the mid-position of the scale.

A single wire 26 extends from one side of the network at the control end to one side of the potentiometer P at the converter location. The other side of the potentiometer P is grounded at 27, giving a ground return to the control end of the network grounded at 28 opposite to the wire 26. Equal impedance devices 29 and 30 are connected across the potentiometer at the converter location; and from their junction a connection extends through a half wave rectifier, or electric valve 31, to the adjustable contact 5 of the potentiometer.

When the contact 5 is at the mid-position of the potentiometer, the converter circuits are balanced and the currents through the receiver are balanced causing the indicator of the ratio meter to be biased to its mid-position. When, however, the controlling influence moves the contact 5 from its mid-position, currents will be passed through the converter from the source, and the average value of these currents will be unbalanced causing more current to pass to one side of the receiver network than to the other side in its passage to the lower terminal of the secondary of the transformer 21. This unbalancing of the currents in the respective branches of the network will cause the meter pointer to be deflected from its mid-position to one side or the other according to the direction of movement of the contact 5 from its central position. And the greater the displacement of the contact 5, the greater will be the unbalancing of the currents in the receiver network and the greater will be the deflection of the instrument pointer from its mid-position. It follows that the instrument will at all times reflect the position of the contact 5 at the distant converter location.

With reference to each of the foregoing disclosures, this improvement is based fundamentally on a novel relationship of the bridge network as regards to elements and connections and relation to the variable controlling means. In each disclosure one of the meter windings is connected in series with an impedance device across the controlling means; and another of the meter windings is connected in series with another impedance device across the controlling means. Also the meter winding A of one such series connection and the impedance device C of the other such series connection are connected to one side of the controlling means, and the meter winding B of one such series connection and the impedance device D of the other such series connection are connected to the other side of the controlling means. Furthermore one side of the source is connected to the controlling means and the other side to the junction of the impedance devices E and F or to an intermediate point of an impedance device in which the devices E and F may be considered as combined in one unit, as indicated in Fig. 6. The remaining terminals of E and F are connected respectively to the intermediate connections of the series impedance devices and windings of the above described series connections.

It will be understood that the invention may be applied to various other purposes and that modifications may be made for adaptation to particular requirements. Likewise various values and relative values of the impedance devices and coil impedances may be used with advantageous results, even though the requirements of their proper proportional matching, or approximate proportional matching may not be obtained; but the closer the proportional matching is obtained, the more fully are the advantages of the invention attained. Although the various impedance or resistance devices have not been indicated in the drawings as adjustable, they may be made such for obtaining their desired values and when so obtained, they may be made as adjustable or nonadjustable units of the ranges or values previously determined. The impedance devices may be capacitive, resistive, or inductive, or a combination of two or all three, according to their selection for particular purposes.

I claim:

1. A bridge network comprising controlling means connected to one portion of the network for varying the energy supplied to the respective branches of the network, a ratio meter having windings, an impedance device connected in series with one of the windings of the said meter, said series combination being connected across said controlling means, a second impedance device connected in series with another of the windings of said meter, said second series combination being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected across said controlling means, a fourth impedance device connected between the intermediate connections respectively of the impedance devices and windings of said first and second series combinations, and a source of energy having one terminal thereof connected between portions of said third impedance device, the other terminal of said source being connected between portions of said fourth impedance device.

2. A bridge network comprising controlling means connected to one portion of the network for varying the energy supplied to the respective branches of the network, a ratio meter having windings, an impedance device connected in series with one of the windings of the said meter, said series combination being connected across said controlling means, a second impedance device connected in series with another of the windings of said meter, said second series combination being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected across said controlling means, a fourth impedance device connected between the intermediate connections respectively of the impedance devices and windings of said first and second series combinations, and a source of energy having one terminal thereof connected between portions of said third impedance device, the other terminal of said source being connected between portions of said fourth impedance device, said impedance devices being relatively proportioned for obtaining approximately zero current in said windings respectively when the controlling means is at its respective limits of control.

3. A bridge network comprising controlling means connected to one portion of the network for varying the energy supplied to the respective branches of the network, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected across said controlling means, a fourth impedance device connected between the intermediate connections respectively of the impedance devices and windings of said first and second series combinations, a source of energy having one terminal thereof connected between portions of said third impedance device, the other terminal of said source being connected between portions of said fourth impedance device, and means connected in circuit with said windings for reducing the effects of temperature changes of said windings.

4. A bridge network comprising controlling means connected to one portion of the network for varying the energy supplied to the respective branches of the network, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected across said controlling means, a fourth impedance device connected between the intermediate connections respectively of the impedance devices and windings of said first and second series combinations, a source of energy having one terminal thereof connected between portions of said third impedance device, the other terminal of said source being connected between portions of said fourth impedance device, and means connected in circuit with said windings for reducing the effects of temperature changes of said windings, certain of said impedance devices being of materials having low temperature coefficients of resistance.

5. A bridge network comprising controlling means connected to one portion of the network for varying the energy supplied to the respective branches of the network, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected across said controlling means, a fourth impedance device connected between the intermediate connections respectively of the impedance devices and windings of said first and second series combinations, a source of energy having one terminal thereof connected between portions of said third impedance device, the other terminal of said source being connected between portions of said fourth impedance device, and means of material having different temperature coefficient of resistance from said first and second named impedance devices connected respectively to said first and second named impedance.

6. A bridge network comprising controlling means connected to one portion of the network for varying the energy supplied to the respective branches of the network, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected in shunt across said controlling means, a fourth impedance device connected between the intermediate connections respectively of the impedance devices and windings of said first and second series combinations, a source of energy having one terminal thereof connected between portions of said third impedance device, the other terminal of said source being connected between portions of said fourth impedance device, and means of material having different temperature coefficient of resistance from said third impedance device connected to said third impedance device.

7. A bridge network comprising controlling means connected to one portion of the network for varying the energy supplied to the respective branches of the network, a ratio meter having windings, an impedance device connected in series with one of the windings of the said meter, said impedance device and winding being connected across said controlling means, a second impedance device connected in series with another of the windings of said meter, said second impedance device and other winding being connected across said controlling means, the said series combinations having the impedance device of said first named series combination and the winding of the second named series combination connected to one side of said controlling means and having the winding of said first named series combination and the impedance device of the said second named series combination connected to the other side of said controlling means, a third impedance device connected in shunt across said controlling means, a fourth impedance device connected between the intermediate connections respectively of the impedance devices and windings of said first and second series combinations, a source of energy having one terminal thereof connected between portions of said third impedance device, the other terminal of said source being connected between portions of said fourth impedance device, and a resistance device connected in shunt across said controlling means.

8. A bridge network comprising controlling means with an adjustable contact connected to one portion of the network for varying the energy supplied to the respective branches of the network, a ratio meter having windings, an impedance device connected in series with one of the windings of the said meter across said controlling means, a second impedance device connected in series with another of the windings of said meter across said controlling means, the said series connections having the impedance device of said first named series connection and the winding of the second named series connection connected to one side of said controlling means and having the winding of said first named series connection and the impedance device of the said second named series connection connected to the other side of said controlling means, a third impedance device connected in shunt across said controlling means, a fourth impedance device connected between the intermediate connections respectively of the impedance devices and windings of said first and second series connections, a source of energy having one terminal thereof connected between portions of said third impedance device, the other terminal of said source being connected between portions of said fourth impedance device, a fifth impedance device connected in shunt across said controlling means, and an electric valve connected from an intermediate portion of said last named impedance device to said adjustable contact.

9. A bridge network comprising controlling means with an adjustable contact connected to one portion of the network for varying the energy supplied to the respective branches of the network, a ratio meter having windings, an impedance device connected in series with one of the windings of the said meter, said impedance device being connected to said controlling means and said winding being connected to ground, a second impedance device connected in series with another of the windings of said meter, said second impedance device and other winding being connected in series with another of the windings of said meter, said second impedance device being connected to ground and the other winding being connected to said controlling means, the said series combinations having the impedance device of said first named series combination and the winding of the second named series combination connected to one side of said controlling means and having the winding of said first named series combination and the impedance device of the said second named series combination connected to ground, a third impedance device connected in shunt across said first impedance device and said first winding, a fourth impedance device connected between the intermediate connections respectively of the impedance devices and windings of said first and second series combinations, a source of energy having one terminal thereof connected between portions of said third impedance device, the other terminal of said source being connected between portions of said fourth impedance device, a fifth impedance device connected in shunt across said controlling means, and an electric valve connected from an intermediate portion of said fifth impedance device to said adjustable contact, one side of said fifth impedance device and of said controlling means being connected to ground.

10. A bridge network comprising means connected thereto for controlling energy supplied to the respective branches of the network, a ratio meter including a pair of windings connected to said controlling means, an impedance element in series with one of said windings, said series combination being connected to said controlling means, a second impedance element in series with the other of said windings, said second series combination being connected to said controlling means, said first and second series combinations being connected in parallel with each other and the parallel combination being bridged across said controlling means, a third impedance element connected across said controlling means, a fourth impedance element connected between the intermediate connections respectively of the impedance elements and windings of said first and second series combinations, a source of energy having one terminal thereof connected to said third impedance element, the other terminal of said source being connected to said fourth impedance element.

11. A bridge network comprising variable means for controlling energy supplied to the respective branches of the network, one side of said variable means being connected to ground, a source of energy having one terminal thereof connected to said variable means, a ratio meter including a pair of windings connected to said variable means, a first impedance means connected serially with one of said windings, a second impedance means connected serially with the other of said windings, said first and second series combinations being connected in parallel relationship with each other and having one side connected to said variable means and the other side connected to ground, and third impedance means connected respectively to the junctions between said first impedance means and associated winding and said second impedance means and associated winding, the other terminal of said source being connected to said third impedance means.

12. A bridge network comprising variable means for controlling energy supplied to the respective branches of the network, a ratio meter including a pair of windings connected to said variable means, an armature responsive to said windings, said windings being so disposed as to cause said armature to travel over a range greater than 90°, an impedance element serially connected with one of said windings, a second impedance element serially connected with the other of said windings, said first and second series combination being connected in parallel relationship with each other and the parallel combination being bridged across said variable means, a third impedance element connected in shunt across said controlling means, a fourth impedance element connected between the intermediate connections respectively of the impedance elements and windings of said first and second series combinations, a source of energy having one terminal thereof connected between portions of said third impedance element, the other terminal of said source being connected to said fourth impedance element.

13. A bridge network comprising means connected to one portion of the network for controlling energy supplied to the respective branches of the network, a member in said means responsive to a controlling influence, a ratio meter including a pair of windings connected to said controlling means, an impedance element in series with one of said windings, said series combination being connected to said controlling means, a second impedance element in series with the other of said windings, said second series combination being connected to said controlling means, said first and second series combinations being connected in parallel with each other and the parallel combination being bridged across said controlling means, a third impedance element connected in shunt across said controlling means, a fourth impedance element connected between the intermediate connections respectively of the impedance elements and windings of said first and second series combinations, a source of energy having one terminal thereof connected between portions of said third impedance element, the other terminal of said source being connected to said fourth impedance element.

14. A bridge network comprising means with an adjustable member connected to one portion of the network for controlling the energy supplied to the respective branches of the network, a ratio meter including a pair of windings connected to said controlling means, an impedance element in series with one of said windings, said series combination being connected to said controlling means, a second impedance element in series with the other of said windings, said first and second series combinations being connected in parallel with each other and the parallel combination being bridged across said controlling means, a third impedance element connected across said first series combination, a fourth impedance element connected between the intermediate connections respectively of the impedance elements and windings of said first and second series combinations, a source of energy having one terminal thereof connected between portions of said third impedance element, the other terminal of said source being connected to said fourth impedance element, said impedance elements being relatively proportioned for obtaining reversal of current of said windings respectively when the adjustable member is at its respective limits of control, a fifth impedance element connected across said controlling means, and an electric valve interposed between said adjustable member and said fifth impedance element.

15. A bridge network comprising means with an adjustable member connected to one portion of the network for controlling the energy supplied to the respective branches of the network, a ratio meter including a pair of windings connected to said controlling means, an impedance element in series with one of said windings, said series combination being connected to said controlling means, a second impedance element in series with the other of said windings, said first and second series combinations being connected in parallel with each other and the parallel combination being bridged across said controlling means, a third impedance element connected across said second series combination, a fourth impedance element connected between the intermediate connections respectively of the impedance elements and windings of said first and second series combinations, a source of energy having one terminal thereof connected to said third impedance element, the other terminal of said source being connected to said fourth impedance element, said impedance elements being relatively proportioned for obtaining decrease of current in said windings respectively when the adjustable member approaches its respective limits of control, a fifth impedance element connected across said controlling means, and a rectifier element interposed between said adjustable member and said fifth impedance element.

CLARE ANDERSON.